(12) United States Patent
Cassetti et al.

(10) Patent No.: US 8,370,274 B2
(45) Date of Patent: Feb. 5, 2013

(54) APPARATUSES AND METHODS FOR DETERMINISTIC PATTERN MATCHING

(75) Inventors: David K. Cassetti, Tempe, AZ (US); Sanjeev Jain, Schewsbury, MA (US); Christopher F. Clark, Chandler, AZ (US); Lokpraveen Bhupathy Mosur, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 867 days.

(21) Appl. No.: 12/475,357

(22) Filed: May 29, 2009

(65) Prior Publication Data

US 2010/0306263 A1    Dec. 2, 2010

(51) Int. Cl.
*G06F 13/00* (2006.01)
*G06F 7/02* (2006.01)

(52) U.S. Cl. ............... 706/12; 726/11; 726/13; 726/23; 726/24

(58) Field of Classification Search .................... 706/12
See application file for complete search history.

(56) References Cited

U.S. PATENT DOCUMENTS 5,809,035 A * 9/1998 Sikdar et al. .................. 714/718

* cited by examiner

*Primary Examiner* — David R Vincent
*Assistant Examiner* — Nathan Brown, Jr.
(74) *Attorney, Agent, or Firm* — Trop, Pruner & Hu, P.C.

(57) ABSTRACT

Apparatuses and methods to perform pattern matching are presented. In one embodiment, an apparatus comprises a memory to store a first pattern table comprising information indicative of whether a byte of input data matches a pattern and whether to ignore other matches of the pattern occur in remaining bytes of the input data. The apparatus further comprises one-byte match logic coupled to the memory, to determine, based on the information in the first pattern table, a one-byte match event with respect to the input data. The apparatus further comprises a control unit to filter the other matches of the pattern based on the information of the first pattern table.

19 Claims, 10 Drawing Sheets

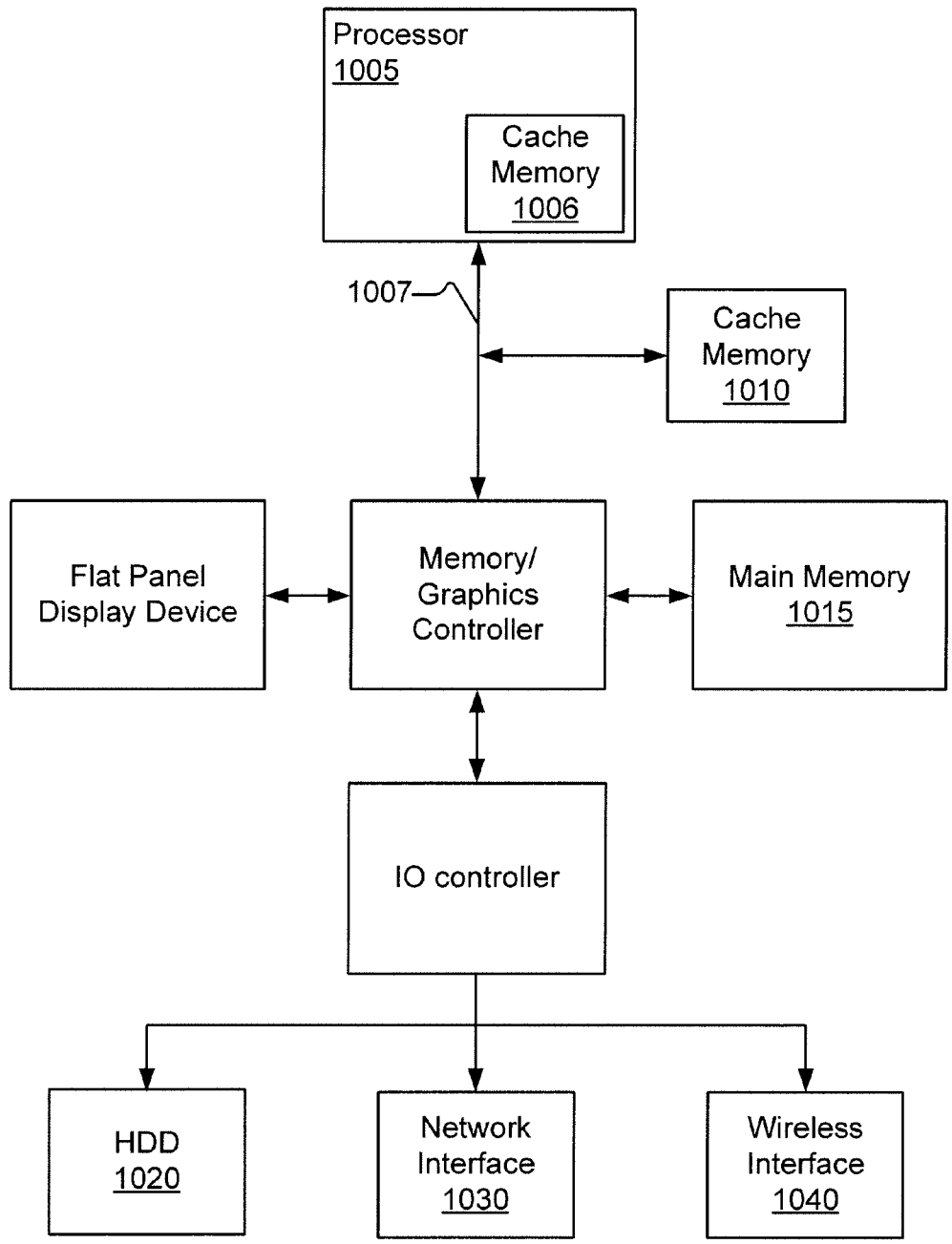

APPARATUSES AND METHODS FOR DETERMINISTIC PATTERN MATCHING

FIELD OF THE INVENTION

Embodiments of the invention relate to pattern matching of computer data; more particularly, embodiments of the invention relate to hierarchical pattern matching.

BACKGROUND OF THE INVENTION

In pattern matching (or string matching), a processor determines whether a data stream or a portion of a data stream matches one or more predefined patterns. That data stream may be data entering a computer node from a remote computer node. For example, the predefined patterns may be virus patterns or other undesirable codes present in the data stream.

Pattern matching is also useful in inspecting and classifying packets sent over a network. For example, a network firewall or an intrusion detection system may inspect packets for computer virus patterns and appropriately filter such packets. A server load balancer may compare text within the packets to a list of Universal Resource Locator (URL) addresses, then classify and redirect the packets to specific servers based on the URLs. Such classification of packets requires comparison of the packets with a set of predefined patterns.

A method of inspecting the packets is by performing a "brute force" approach, which compares the packets with an entire set of predefined patterns. The computation time of this method increases in proportion to the amount of incoming data and the number of patterns.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

FIG. 10 illustrates a computer system for use with one embodiment of the present invention.

DETAILED DESCRIPTION OF THE INVENTION

Figure 1:
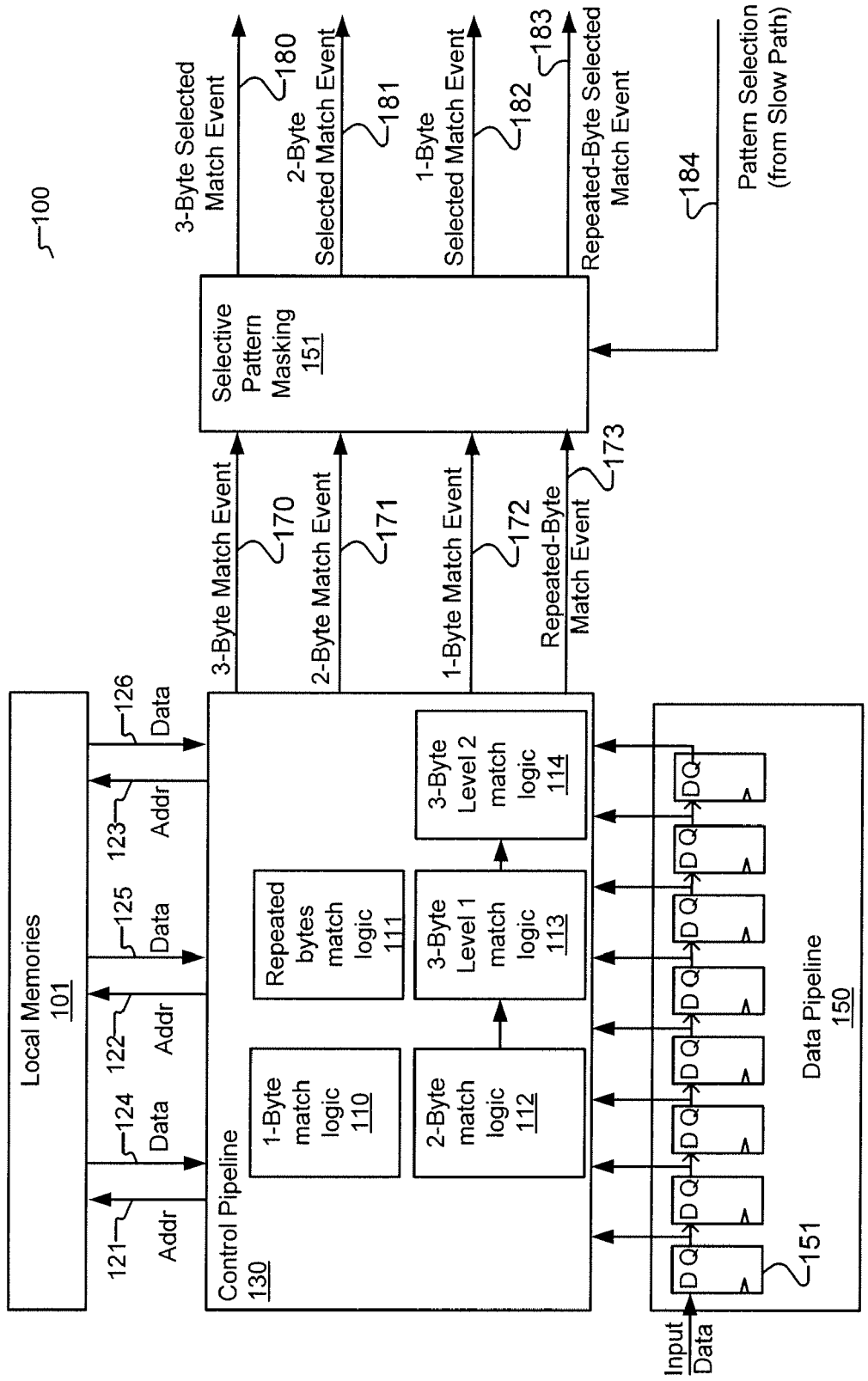
FIG. 1 is a block diagram of an embodiment of pattern matching apparatus.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The methods and apparatuses described herein are for pattern matching of computer data, which is primarily discussed in reference to computer systems. However, the methods and apparatuses for pattern matching of computer data are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads.

Overview

In one embodiment, high-speed parallel detection against a large pattern set on input data is performed hierarchically by two logic parts: (1) a fast, deterministic path to determine partial matches and (2) a slow, non-deterministic path to complete the pattern matching. The first part (fast-path) searches for short substrings of the pattern set to reduce total memory that is other requires storing pattern sets in full. The second part (slow-path) receives partial matches and performs further analysis on the partial matches. For example, a string which includes at least one or more bytes of a full pattern is referred to herein as a partial match. A complete match is when a partial match in fact contains all the bytes according to a pattern.

FIG. 1 is a block diagram of an embodiment of pattern matching apparatus with respect to fast-path of pattern matching. Many related components such as buses and peripherals have not been shown to avoid obscuring the invention. Referring to FIG. 1, in one embodiment, pattern matching apparatus 100 includes local memories 101, address signals 121-123, data signals 124-126, control pipeline 130, data pipeline 150, and selective pattern masking 151. In one embodiment, the number of sets of memory interfaces is more than three. Other embodiments of the invention, however, may be implemented within other devices within a system or distributed throughout a system in hardware, software, or some combination thereof.

In one embodiment, local memories 101 are coupled to control pipeline 130 via address signals 121-123 and data signal 124-126. In one embodiment, control pipeline 130 further comprises one-byte match logic 110, two-byte match logic 112, three-byte level 1 match logic 113, three-byte level 2 match logic 114, and repeated-byte match logic 111. In one embodiment, data pipeline 150 comprises first-in-first-out (FIFO) buffer 151 to store input data. In one embodiment, data from FIFO buffer 151 are coupled to control pipeline 130.

In one embodiment, pattern matching apparatus 100 performs a fixed length search of string patterns (e.g., 1 byte, 2 bytes, 3 bytes, repeated bytes pattern) stored in pattern database. In one embodiment, pattern matching apparatus 100 performs detection of such patterns at a processing rate of 1 byte (input data) per clock cycle. In one embodiment, control pipeline 130 generates one or more match events, each match event include a match address. The match address is associated with a pattern identifier which will be used for accessing further analysis in slow-path (not shown).

In one embodiment, control pipeline 130 issues a command to initialize local memories 101 with a pattern database (a pattern set). In one embodiment, a large pattern set contains about 20,000 to 30,000 substrings. In one embodiment, local memories 101 are smaller than memories that store entries corresponding to complete combinations of 3 bytes data (i.e., 24 bits, which result in 2^24 entries of pattern information).

In one embodiment, data pipeline 150 comprises FIFO buffer 151 with delay taps from which previously received input data are used by control pipeline 130. FIFO buffer 151 includes several stages of data in pipeline. Each stage of data pipeline 150 stores an input data byte and a valid bit associated with the input byte. In one embodiment, FIFO buffer 151 is implemented partly with shift registers. In one embodiment, valid bits are used at the beginning and the end of a data fragment if not all data in data pipeline 150 are valid. In one embodiment, data pipeline 150 also includes a current position counter (not shown) that indicates what is the current position (relative to the start of an input data fragment) of the most recent byte that has entered data pipeline 150.

In one embodiment, control pipeline 130 receives input data, valid bit, and the current position counter value from data pipeline 150. In one embodiment, control pipeline 130 includes several match logic units: one-byte match logic 110, repeated-byte match logic 111, two-byte match logic 112, three-byte level 1 match logic 113, and three-byte level 2 match logic 114. In one embodiment, match logic units sends addresses and read control to local memories 101 and receive data from local memories 101. Match logic units (e.g., one-byte match logic 110, repeated-byte match logic 111, two-byte match logic 112, three-byte level 1 match logic 113, and three-byte level 2 match logic 114) also generate match events to selective pattern matching 151. In one embodiment, a match event includes a flag indicative of a match occurred, an address associated with the match (which will used as a pattern identifier), and a value of a current position counter when the match occurred. In one embodiment, local memories 101 include data structures for the five match logic units (e.g., match logic 110-114).

In one embodiment, a match logic unit (e.g., one-byte match logic 110) also determines the number of occurrences of a pattern with respect to input data. In one embodiment, one-byte match logic 110 includes counting mechanisms (e.g., counters) to determine the number of occurrences of each one-byte pattern. In one embodiment, one-byte match logic 110 determines whether to report only the first one-byte match event of a pattern and to filter other following one-byte match events of the same pattern (with respect to input data). In one embodiment, one-byte match logic 110 disables detection after a certain number of bytes of input data based on information in pattern database.

In one embodiment, selective pattern masking 151 receives match events from the control pipeline 130 and receives pattern selection 184 from slow-path. In one embodiment, selective pattern masking 151 filters match events from control pipeline 130 and generates selected match events (based on filtering information including pattern selection 184). In one embodiment, selective pattern matching 151 generate match events, such as, for examples, three-byte selected match event 180, two-byte selected match event 181, one-byte selected match event 182, and repeated-byte selected match event 183.

In one embodiment, when starting a new input data fragment, data pipeline 150 resets valid bits to zeroes and resets a current position to a starting value. In one embodiment, as input data shifts into data pipeline 150, valid bits are set to indicate that valid data are present. In one embodiment, control pipeline 130 receives an indication that valid data are available. In one embodiment, control pipeline 130 generates match events based on the input data and pattern data structures read from local memories 101. In one embodiment, when all stages in data pipeline 150 are valid, match logic units operate in parallel and process input data at the rate of 1 clock cycle per byte of input data.

In one embodiment, match logic generates a match event when a match has occurred. In one embodiment, it is possible that one or more match events (from different match logic units) occur in a clock cycle.

In one embodiment, one-byte match logic 110 generates one-byte match event 172, two-byte match logic 112 generates two-byte match event 171, and repeated-byte match logic 111 generates repeated-byte match event 173. In one embodiment, three-byte level 1 match logic 113 and three-byte level 2 match logic 114 generate three-byte match event 170. In one embodiment, two-byte match events and three-byte match events indicate whether the match event is a complete match or a partial match. In one embodiment, additional pattern matching is performed by slow-path if the match event is a partial match. The match logic units will be described in further detail below with additional references to the remaining figures.

In one embodiment, before a match event is sent to slow-path, selective pattern masking 151 determines whether to filter (remove) the event by referring to the match address. In one embodiment, selective pattern masking 151 includes a lookup table indexed by using a match address. The lookup table contains information on whether a pattern is masked (should be filtered) or not (should be propagated to slow-path). In one embodiment, if a match event is masked, the mask event is not sent to slow-path.

In one embodiment, pattern matching apparatus 100 with respect to FIG. 1 is used in conjunction with applications of scanning files, packets, images, and executable files for patterns (e.g., viruses).

In one embodiment, pattern matching apparatus 100 has a lower memory read latency when compared to other approaches such as, for example, ClamAV and Snort) which store substrings of length 3 and less in an Aho-Corasick machine (AC) or Deterministic Finite Automaton (DFA). Such approaches require a series of dependent reads, e.g. when searching for the substring "abc" from a starting state, the first character ('a') is used to look up the address for a next state, which is then used in conjunction with the second character ('b') to form a subsequent next address. In one embodiment, pattern matching apparatus 100 is of lower memory read latency because pattern matching apparatus 100 uses a pipelined design and partitioned memory system to avoid dependent reads.

In one embodiment, pattern matching apparatus 100 requires a smaller memory than other methods (e.g., storing results of all combinations of three bytes data). In one embodiment, local memories 101 store a pattern set using different data structures. In one embodiment, a part of a three-byte pattern set is partitioned into two memory partitions (level 1 and level 2). In one embodiment, it is possible to reallocate the sizes of the memory partitions to save total memory in use.

In one embodiment, selective pattern masking 151 reduces the number of one-byte match events. Without filtering logic of selective pattern masking 151, it is possible that input data generate too many one-byte match events (because the high probability of matching one-byte patterns) and cause slow-path to be overloaded. In one embodiment, selective pattern masking 151 receives feedback (pattern selection 184) from slow-path such that match events that had occurred will be filtered when the pattern occur again in the remaining data stream. In one embodiment, selective pattern matching 151 reduces the number of match events (e.g., one-byte match events, two-byte match events, and three-byte match events) by masking patterns that have been identified by the slow-path.

In one embodiment, repeated bytes are reported as one repeated-byte match event 173 rather than multiple one-byte match events (e.g., one-byte match event 172). For example, input data include 100 bytes of "0x00", control pipeline 130 generates one repeated-byte match event 173 rather than reporting 100 one-byte match events which increase unnecessary work load to slow-path. In one embodiment, coalescing repeated-byte pattern matching saves resources in slow-path because fewer events will be sent to slow-path.

One-Byte Match Logic

Figure 2:
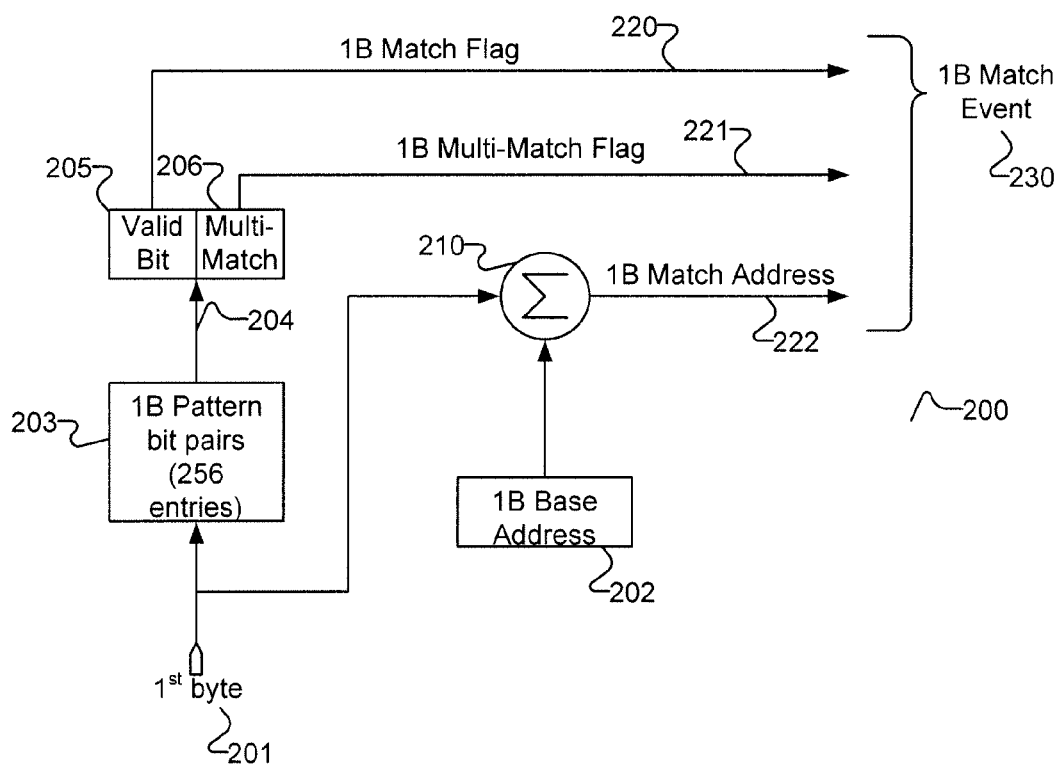
FIG. 2 is a block diagram of an embodiment of one-byte match logic.

FIG. 2 is a block diagram of an embodiment of one-byte match logic. Many related components such as buses and peripherals have not been shown to avoid obscuring the invention. Referring to FIG. 2, in one embodiment, one-byte match logic 200 includes one-byte pattern bit pairs 203. In one embodiment, inputs of one-byte match logic 200 are first byte 201 and one-byte base address 202. In one embodiment, outputs of one-byte match logic 200 include one-byte match flag 220, one-byte multi-match flag 221, and one-byte match address 222. In one embodiment, one-byte match flag 220, one-byte multi-match flag 221, and one-byte match address 222 are collectively referred to herein as one-byte match event 230. In one embodiment, first byte 201 is delayed by two pipeline stages with respect to one-byte base address 202.

In one embodiment, one-byte bit pairs 203 include 256 entries corresponding to all possible combinations of 8-bit data. In one embodiment, each entry includes a valid bit and a multi-match flag.

In one embodiment, one-byte match logic 200 disables detection after a certain number of bytes of input data based on information in pattern database.

In one embodiment, one-byte match logic 200 selects one of 256 bit pairs, stored in a memory, based on first byte 201 which is a byte of input data (e.g., data from a first data register of FIFO 151). In one embodiment, each bit pair contains valid bit 205 and multi-match flag 206. Valid bit 205 indicates whether the first byte exists in one-byte pattern database. In one embodiment, one-byte match logic 200 generates one-byte match flag 220 based on valid bit 205.

In one embodiment, multi-match flag 206 provides selective pattern matching 151 on how to handle a match event, especially when the match event has occurred before. In one embodiment, if multi-match flag 204 is set, multiple match events are generated if multiple bytes of the pattern detected in input data. Additionally, slow-path is operable to disable a pattern if required. In one embodiment, if multi-match flag 204 is not set, the pattern is masked after a first occurrence. In one embodiment, only a match event will be sent to slow-path regarding this particular one-byte pattern even if multiple bytes of the pattern exist in input data. In one embodiment, one-byte match logic 200 generates multi-match flag 221 based on multi-match bit 206.

In one embodiment, one-byte match logic 200 determines the number of occurrences of a one-byte pattern with respect to input data. In one embodiment, one-byte match logic 200 includes counting mechanisms (e.g., counters) to calculate the number of occurrences of each one-byte pattern. In one embodiment, one-byte match logic 200 determines, based partly on multi-match flag 206, whether to report only a first one-byte match event of a pattern and to filter following one-byte match events of the same pattern.

In one embodiment, one-byte match logic 200 generates one-byte match address 222 by adding the value of first byte 201 to one-byte base address register 202 using adder 210.

Two-Byte Match Logic

Figure 3:
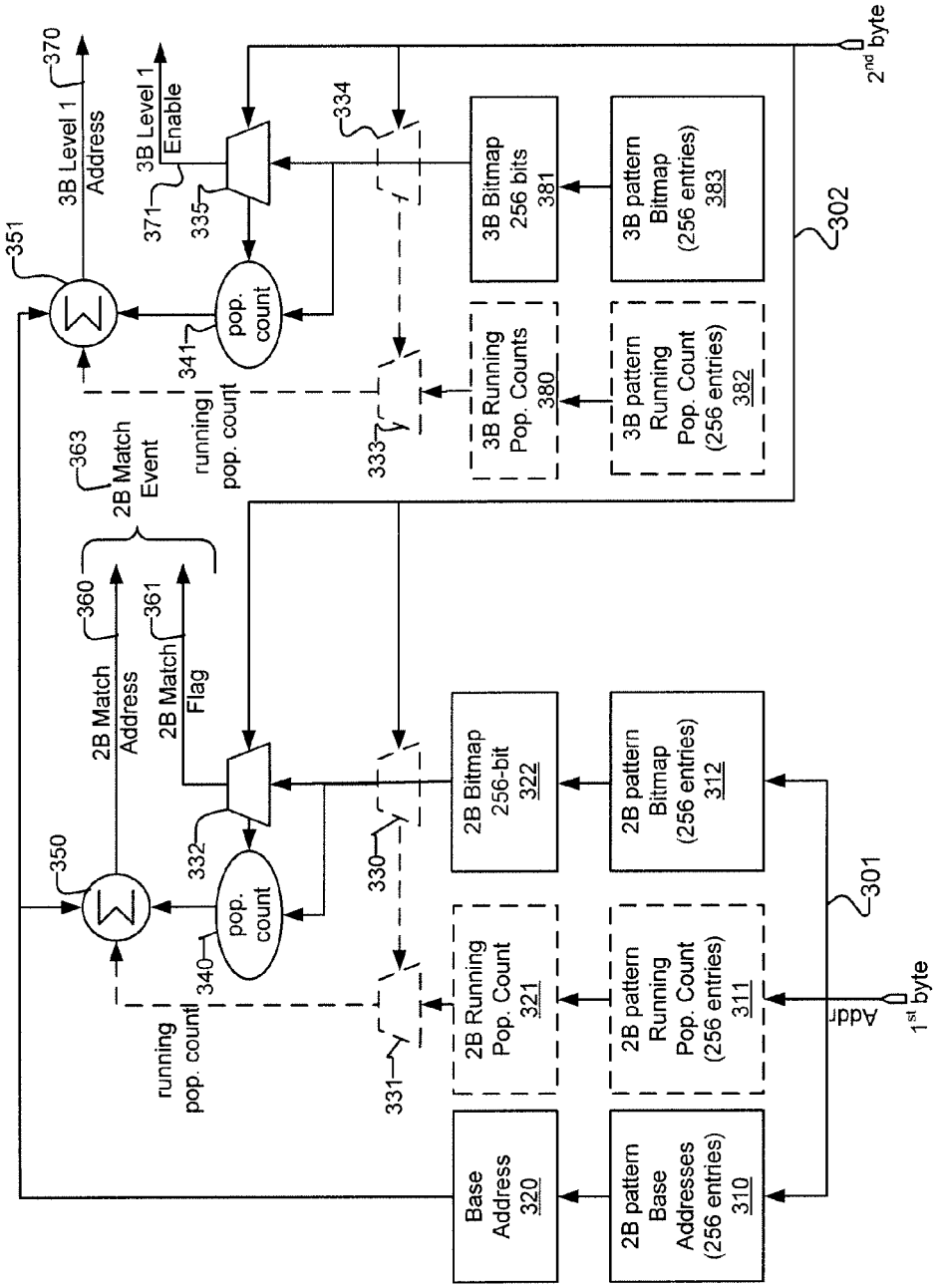
FIG. 3 is a block diagram of an embodiment of two-byte match logic and a part of three-byte match logic.

FIG. 3 is a block diagram of an embodiment of two-byte match logic and a part of three-byte match logic. Many related components such as buses and peripherals have not been shown to avoid obscuring the invention. Referring to FIG. 3, in one embodiment, two-byte match logic comprises two-byte base addresses 310, two-byte running population count 311, two-byte pattern bitmap 312, and multiplexer 330-332, and adder 350.

In one embodiment, inputs of two-byte match logic are first byte 301 and second byte 302. In one embodiment, outputs of two-byte match logic include two-byte match flag 361 and two-byte match address 360. In one embodiment, two-byte match flag 361 and two-byte match address 360 are collectively referred to herein as two-byte match event 363.

In one embodiment, referring to FIG. 3, a part of three-byte match logic includes three-byte pattern running population count 382 and three-byte pattern bitmap 383. In one embodiment, the three-byte match logic also includes multiplexers 333-335 and adder 351. In one embodiment, inputs of three-byte match logic include first-byte 301 and second byte 302. In one embodiment, outputs of three-byte match logic include three-byte level 1 address 370 and three-byte level 1 enable 371. In one embodiment, three-byte match logic with respect to FIG. 3 determines whether first two bytes of a three-byte pattern exist in input data. Outputs from the three-byte match logic (of FIG. 3) are used by other three-byte match logic units which will be described in further detail below with additional references to the remaining figures.

In one embodiment, operations of two-byte match logic and the part of three-byte match logic are similar because both logic units detect occurrence of a two-byte pattern.

In one embodiment, two-byte pattern bitmap 312 stores 256 entries, which each entry is 256 bits. In one embodiment, two-byte match logic selects an entry from two-byte pattern bitmap 312 by using first byte 301 (as an index value) and generates two-byte bitmap 322. In one embodiment, two-byte match logic further selects one bit from two-byte bitmap 322 (256-bit) by using second byte 302 (as an index) and generates two-byte match flag 361. In one embodiment, two-byte match flag 361 indicates whether a two-byte pattern has been detected or not.

In one embodiment, the size of two-byte pattern bitmap 312 is 256 entries×256 bits=64 K bits.

In one embodiment, the part of three-byte match logic performs a similar operation by referring to three-byte pattern bitmap 383 and three-byte bitmap 381. In one embodiment, three-byte match logic generates three-byte level 1 enable 371 which indicates whether a first two bytes of a three-byte pattern have been detected.

In one embodiment, two-byte match logic generates two-byte match address 360 by using first byte 301 as an index value to access two-byte pattern base addresses 310. Two-byte match logic calculates a sum of base address 320 and an offset by using adder 350. In one embodiment, two-byte match logic determines the offset by determining a population count (a number of "ones") of a length of less significant bits of two-byte bitmap 322. In one embodiment, the length is based on the value of second byte 302. For example, if the value of second byte 302 is decimal 97 (hex 61), the offset is equal to adding up the number of 1's in two-byte bitmap 322 from bit positions 0 through 96.

In one embodiment, two-byte match logic performs the population count efficiently by logically splitting 256 bits into a few sections (e.g., 8 sections, each section is 32-bit). In one embodiment, two-byte pattern running population count 311 stores 256 entries, each entry storing values of running (cumulative) population counts corresponding to different sections.

In one embodiment, for example, if the value of second byte 302 is 97 (hex 61), the running population count 321 generates a sum of population counts for the three less significant sections (i.e., bits 0 through 31, 32 through 63, and 64 through 95), whereas population count 340 generates a population count from the remaining bit(s) (i.e., bit 96). In one embodiment, logic for calculation of a population count is shown with dotted lines in FIG. 3.

In one embodiment, two-byte pattern bitmap 312 and three-byte pattern bitmap 383 are combined into one set of 64K bit pairs.

Three-Byte Match Logic (2 Transitions)

Figure 4:
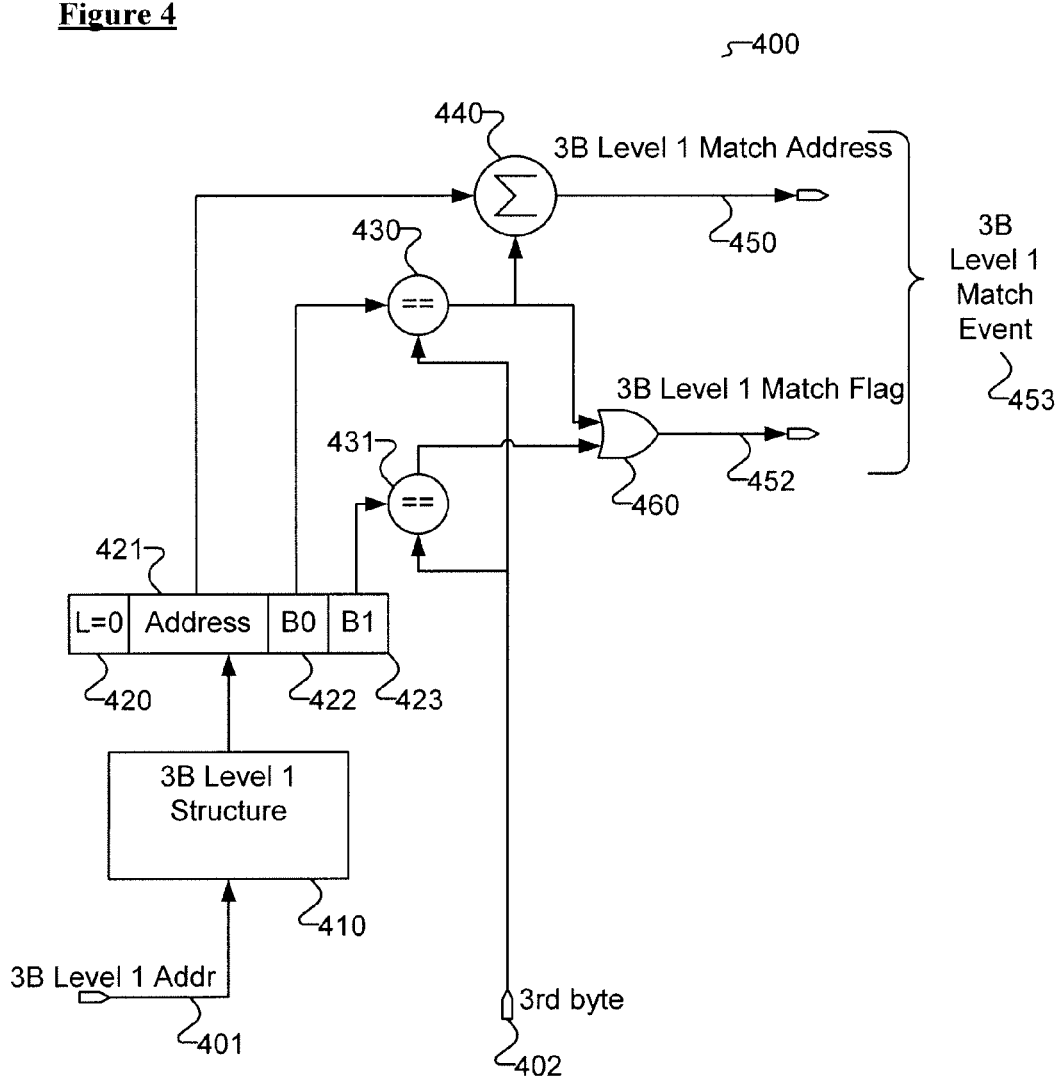
FIG. 4 is a block diagram of an embodiment of three-byte match logic that supports up to two transitions.

FIG. 4 is a block diagram of an embodiment of three-byte match logic that supports up to two transitions. Many related components such as buses and peripherals have not been shown to avoid obscuring the invention. In one embodiment, three-byte match logic 400 is a part of three-byte match logic with respect to FIG. 1. In one embodiment, three-byte match logic 400 is enabled when first two bytes of a three-byte pattern are detected. In one embodiment, three-byte match logic 400 supports two transitions because it supports detecting only two possible data as the third byte of the three-byte pattern. Three-byte match logic units that support eight transitions and 256 transitions will be described in further detail below with additional references to the remaining figures.

Referring to FIG. 4, in one embodiment, three-byte match logic 400 includes three-byte level 1 structure 410, comparators 430-431, adder 440, and OR gate 460. In one embodiment, inputs of three-byte match logic 400 is three-byte level 1 address 401 (e.g., three-byte level 1 address 370 with respect to FIG. 3) and third byte 402. In one embodiment, outputs of three-byte match logic 400 include three-byte level 1 match flag 452 and three-byte level 1 match address 450. In one embodiment, three-byte level 1 match flag 452 and three-byte level 1 match address 450 are collectively referred to herein as three-byte level 1 match event 453.

In one embodiment, three-byte level 1 structure 410 is a lookup table. In one embodiment, three-byte match logic 400 selects an entry from three-byte level 1 structure 410 based on three-byte level 1 address 401 (as an index). In one embodiment, each entry of three-byte level 1 structure 410 includes L bit 420, Address 421, byte0 422, and byte1 423.

In one embodiment, L bit 420 indicates whether there is only one or two possible three-byte patterns given the first two bytes are matched. In one embodiment, L bit 420 is 0 if only one or two possible three-byte patterns given the first two bytes are matched. In one embodiment, majority of three-byte patterns have 2 or fewer transitions.

In one embodiment, byte0 422 and byte1 423 are two possible third byte of a three-byte pattern. In one embodiment, byte0 422 and byte1 423 are the same if a three-byte pattern requires only one possible transition.

In one embodiment, comparator 430 performs a comparison between byte0 422 and third byte 402. Comparator 431 performs a comparison between byte1 423 and third byte 402. In one embodiment, three-byte level 1 match flag 452 is set if either byte (byte0 422 or byte1 423) matches third byte 402.

In one embodiment, three-byte match logic 400 generates three-byte level match address 450 by adding base address 421 and an offset value (by using adder 440). In one embodiment, the offset value is 1 if byte0 422 is equal to third byte 402, otherwise the offset value is 0. In one embodiment, three-byte level 1 match address 450 is set to all zeroes if three-byte level 1 match flag 452 is 0.

Three-Byte Match Logic (8 Transitions)

Figure 5:
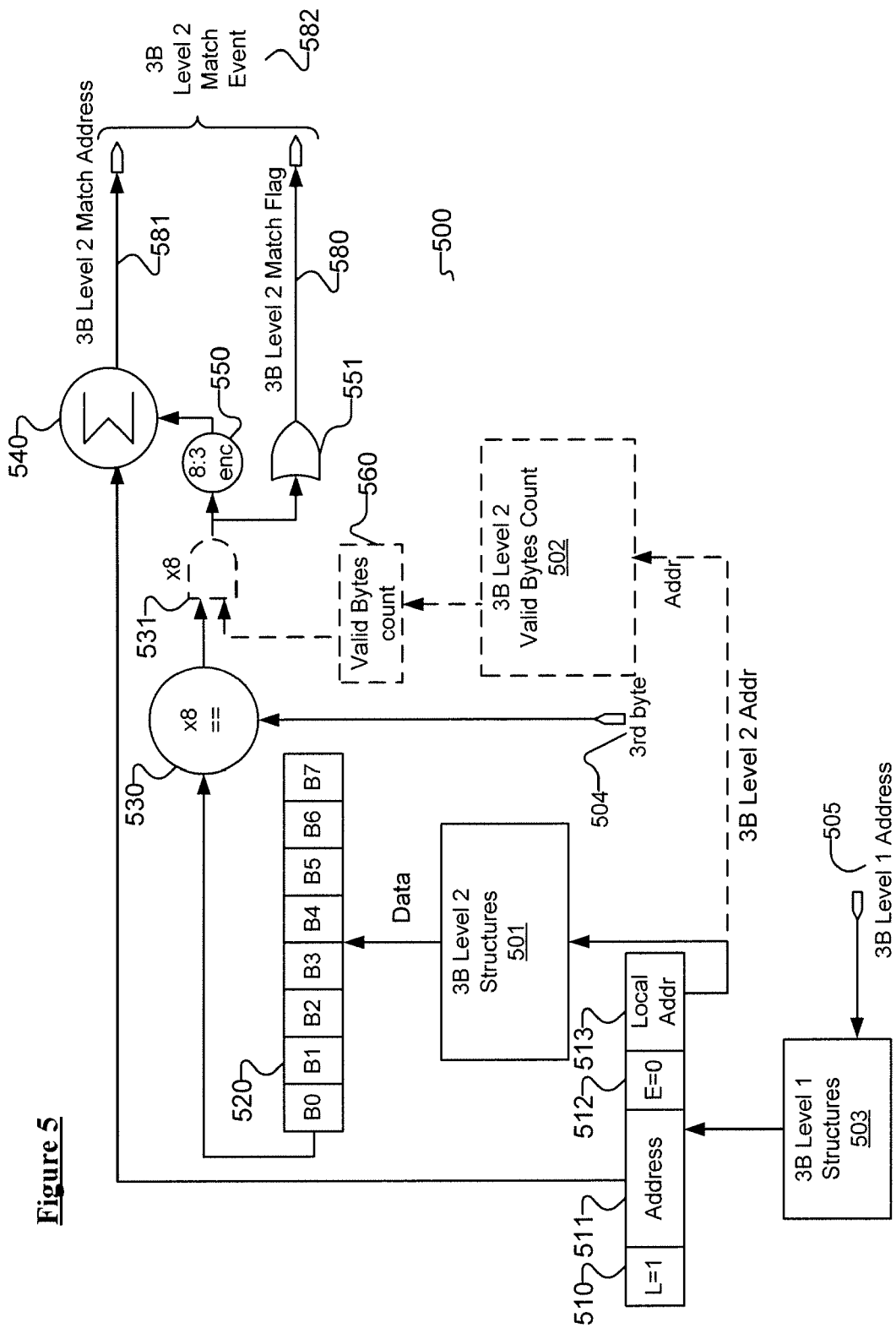
FIG. 5 is a block diagram of an embodiment of three-byte match logic that supports up to eight transitions.

FIG. 5 is a block diagram of an embodiment of three-byte match logic that supports up to eight transitions. Many related components such as buses and peripherals have not been shown to avoid obscuring the invention. In one embodiment, three-byte match logic 500 is a part of three-byte match logic with respect to FIG. 1. In one embodiment, three-byte match logic 500 is enabled when first two bytes of a three-byte pattern are detected. In one embodiment, three-byte match logic 500 supports up to eight transitions. In one embodiment, three-byte match logic 500 supports up to 8 possible thee-byte patterns given first two bytes data are matched.

Referring to FIG. 5, in one embodiment, three-byte match logic 500 includes three-byte level 1 structure 503, three-byte level 2 structure 501, three-byte level 2 valid bytes count 502, valid bytes count 560, comparator 530, encoder 550, OR gate 551, and AND gate 531. In one embodiment, inputs of three-byte match logic 500 include three-byte level 1 address 505 (e.g., three-byte level 1 address 370 with respect to FIG. 3) and third byte 504. In one embodiment, outputs of three-byte match logic 500 include three-byte level 2 match flag 580 and three-byte level 2 match address 581. In one embodiment, three-byte level 2 match flag 580 and three-byte level 2 match address 581 are collectively referred to herein as three-byte level 2 match event 582.

In one embodiment, three-byte level 1 structure 503 is a lookup table. In one embodiment, three-byte match logic 500 selects an entry from three-byte level 1 structure 503 based on three-byte level 1 address 505 (as an index).

In one embodiment, an entry of three-byte level 1 structure 503 includes L bit 510, address 511, E bit 512, and local address 513. In one embodiment, L bit is set if a pattern has only eight or fewer transitions, otherwise L bit 510 is "0". In one embodiment, E bit 512 is "0" to indicate that a pattern has up to eight transitions, whereas E bit 512 is "1" if a pattern has up to 256 transitions.

In one embodiment, local address 513 is the address for accessing three-byte level 2 structure 501 and three-byte level 2 bytes valid bytes count structure 502.

In one embodiment, each of the entry of three-byte level 2 structure 501 contains information about eight possible bytes B0-B7 (bytes 520). In one embodiment, some of the bytes are same if the number of transitions of a pattern is fewer than 8.

In one embodiment, comparator 530 compares the eight bytes with third byte 504 (input data). In one embodiment, three-byte level 2 match flag 580 is set if any of the bytes (B0-B7 520) matches third byte 504.

In one embodiment, three-byte match logic 500 generates three-byte level 2 match address 581 by adding base address (from address 511) and an offset (by using adder 540). In one embodiment, the offset is an output from encoder 550. In one embodiment, the offset is an encoded value of a first matching byte position from the eight bytes. For example, if B3 matches third byte 504, the offset value is 3.

In one embodiment, the offset is generated in conjunction with other information, such as, for example, a count of valid bytes (valid bytes count 560). In one embodiment, three-byte match logic 500 reads valid bytes count 560 from three-byte level 2 valid bytes count structure 502 based on local address 513. In one embodiment, a value indicative of a running population count is used rather than a count of valid bytes.

Three-Byte Match Logic (256 Transitions)

Figure 6:
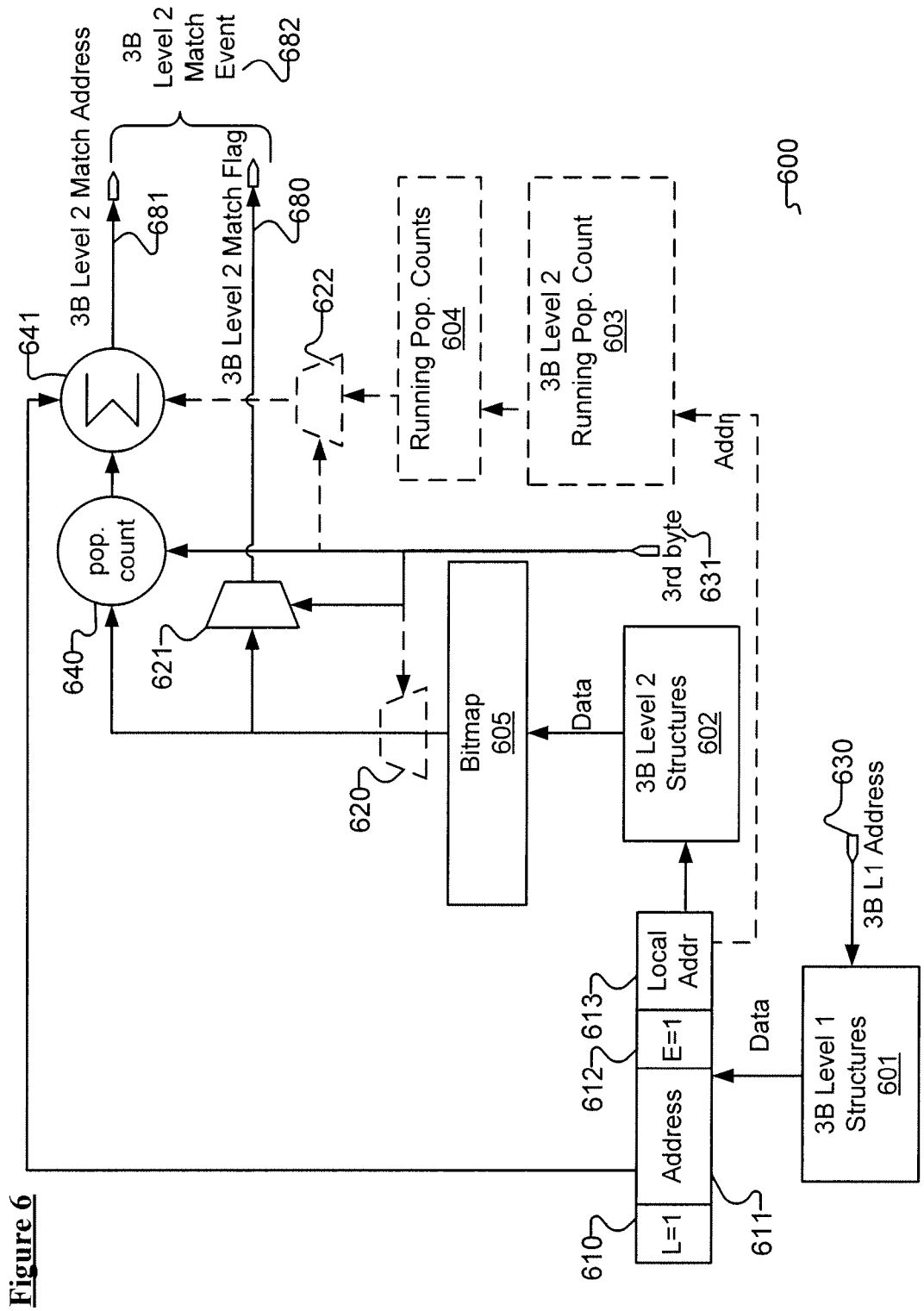
FIG. 6 is a block diagram of an embodiment of three-byte match logic that supports up to 256 transitions.

FIG. 6 is a block diagram of an embodiment of three-byte match logic that supports up to 256 transitions. Many related components such as buses and peripherals have not been shown to avoid obscuring the invention. In one embodiment, three-byte match logic 600 is a part of three-byte match logic with respect to FIG. 1. In one embodiment, three-byte match logic 600 is enabled when first two bytes of a three-byte pattern are detected. In one embodiment, three-byte match logic 600 supports 256 transitions. In one embodiment, three-byte match logic 600 supports up to 256 possible three-byte patterns given first two bytes data are matched.

Referring to FIG. 6, in one embodiment, three-byte match logic 600 includes three-byte level 1 structure 601, three-byte level 2 structure 602, three-byte level 2 running population count structure 603, running population counts 604, bitmap 605, population count unit 640, multiplexers 620-622, and adder 641.

In one embodiment, three-byte match logic 600 is merged with three-byte match logic 500 (with respect to FIG. 5). In one embodiment, multiplexers (not shown) receives control signal (e.g., E bit 612) to determine whether to use outputs from three-byte match logic 500 or outputs from three-byte match logic 600.

In one embodiment, inputs of three-byte match logic 600 include three-byte level 1 address 630 (e.g., three-byte level 1 address 370 with respect to FIG. 3) and third byte 631. In one embodiment, outputs of three-byte match logic 600 include three-byte level 2 match flag 680 and three-byte level 2 match address 681. In one embodiment, three-byte level 2 match flag 680 and three-byte level 2 match address 681 are collectively referred to herein as three-byte level 2 match event 682.

In one embodiment, three-byte level 1 structure 601 is a lookup table. In one embodiment, three-byte match logic 600 selects an entry from three-byte level 1 structure 601 based on three-byte level 1 address 630 (as an index).

In one embodiment, an entry of three-byte level 1 structure 603 includes L bit 610, address 611, E bit 612, and local address 613. In one embodiment, L bit 610 is set if a pattern has only eight or fewer transitions, otherwise L bit 510 is "0". In one embodiment, E bit 612 is "0" to indicate that a pattern has up to eight transitions, whereas E bit 612 is "1" if a pattern has up to 256 transitions.

In one embodiment, local address 613 is the address for accessing three-byte level 2 structure 602 and three-byte level 2 bytes valid bytes count structure 603.

In one embodiment, three-byte match logic 600 selects an entry from three-byte level 2 structure 602 and stores it as bitmap 605. In one embodiment, bitmap 605 contains information on whether third byte 631 is the last byte of a third-byte pattern. In one embodiment, three-byte match logic 600 selects a bit from bitmap 605, based on third byte 631 (of input data). If the bit is "1", three-byte match logic 600 sets three-byte level 2 match flag 680 (to '1') to indicate that a match event has occurred.

In one embodiment, three-byte match logic 600 generates three-byte level 2 match address 681 by adding base address (from address 611) and an offset (by using adder 641). In one embodiment, the offset is a value of a population count similar to the approach described with respect to FIG. 3.

In one embodiment, majority of three-byte patterns have fewer or equal to 8 transitions, such that match logic 600 only store a few number of three-byte patterns that require up to 256 transitions.

Figure 7:
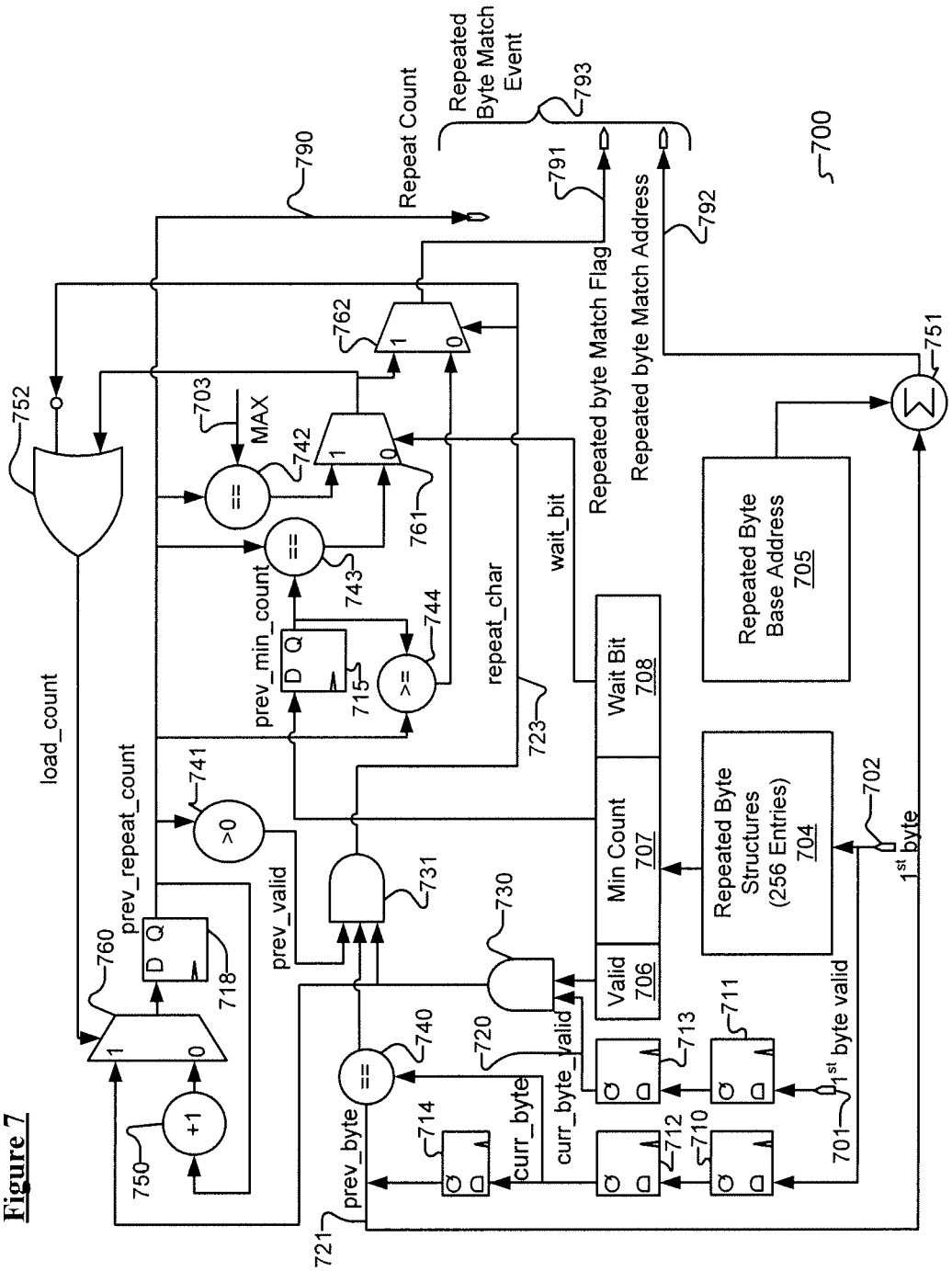
FIG. 7 is a block diagram of an embodiment of repeated-byte match logic.

FIG. 7 is a block diagram of an embodiment of repeated-byte match logic. Many related components such as buses and peripherals have not been shown to avoid obscuring the invention. Referring to FIG. 7, In one embodiment, repeated-byte match logic 700 includes repeated-byte structure 704, repeated-byte base addresses 705, comparators 740-744, up-counter 750, multiplexers 760-762, registers 710-715, register 718, and adder 751.

In one embodiment, inputs of repeated-byte match logic 700 are first byte 702, first byte valid 701, and MAX 703. In one embodiment, outputs of repeated-byte match logic 700 include repeat count 790, repeated-byte match flag 791, and repeated-byte match address 792. In one embodiment, repeat count 790, repeated-byte match flag 791, and repeated-byte match address 792 are collectively known as repeated-byte match event 793.

In one embodiment, first byte 702 is a first byte of the input data (first tap of the data pipeline 150 with respect to FIG. 1). In one embodiment, repeated-byte structure 704 is a look-up table comprising 256 entries. In one embodiment, repeated-byte match logic 700 selects an entry from repeated-byte structure 704 based on first byte 702 (as an index). In one embodiment, each entry of repeated-byte structure 704 includes valid bit 706, min count 707, and wait bit 708.

In one embodiment, valid bit 706 is used to indicate whether first byte 702 presents in pattern database. In one embodiment, min count 707 contains a value indicative of the minimum number of repeated bytes that will generate a match event. In one embodiment, wait bit 708 indicates whether to generate a match event immediately upon receiving a minimum number of repeated bytes (e.g., wait bit 708=0) or to continue as long as there are more data of the same repeated byte (if wait bit 708=1) up to a maximum count value (equal to MAX 703).

In one embodiment, registers 710 and 712 are part of data pipeline 150 with respect to FIG. 1. In one embodiment, register 714 receives and stores a delayed first byte 702 such that data in register 714 are corresponding to valid bit 706, min count 707, and wait bit 708.

In one embodiment, prev_repeat_count 718 stores a value indicative of the number of repeats that have occurred. In one embodiment, repeated-byte match logic 700 sets prev_repeat_count 718 to valid bit 706 if a current byte is not a repeat of the previous byte. In one embodiment, repeated-byte match logic 700 sets prev_repeat_count 718 to valid bit 706 if repeated-byte match logic has generated a repeated-byte match event (setting repeated-byte match flag 791 to "1"). In one embodiment, repeat_char 723 causes prev_repeat_count 718 to increase by 1 if the current byte is a repeated byte, but the match event has not been generated because the number of repeats is not equal to MAX 703 yet.

In one embodiment, repeated-byte match logic 700 generates repeat count 790 which show how many times a byte has repeated sequentially (of input data). In one embodiment, repeated-byte match logic 700 sets repeated byte match flag 791 to report a match event of repeated bytes.

In one embodiment, repeated-byte match logic 700 generates repeated-byte match address 792 by adding a base address and the prev_byte 721 (by using adder 751). In one embodiment, a repeated-byte match event includes repeat count 790 because repeated-byte match logic 700 detects patterns with different length.

Filtering Logic

Figure 8:
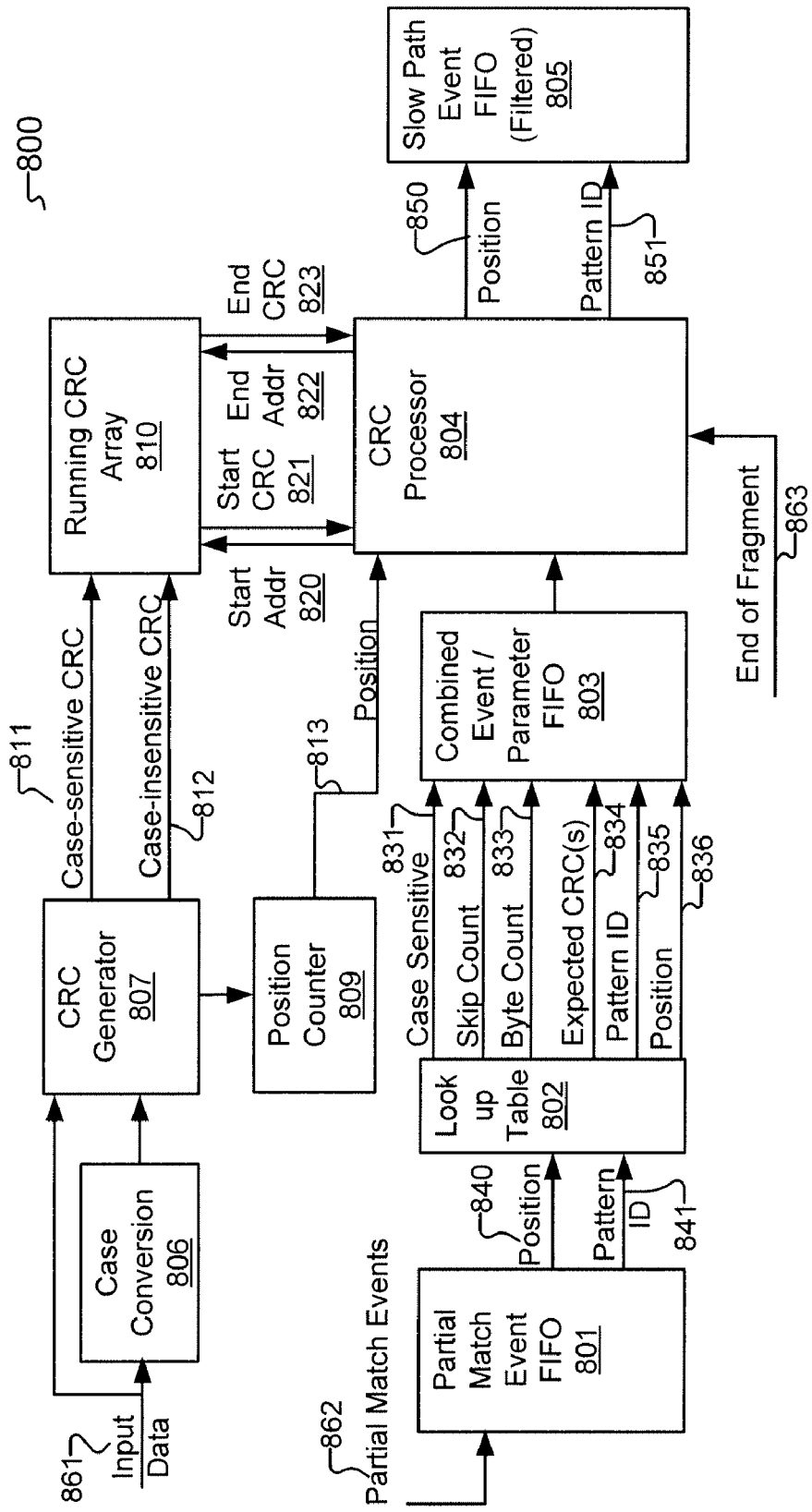
FIG. 8 is a block diagram of an embodiment of filtering logic for partial matches.

FIG. 8 is a block diagram of an embodiment of filtering logic for partial matches. Many related components such as buses and peripherals have not been shown to avoid obscuring the invention. Referring to FIG. 8, in one embodiment, filtering logic 800 includes partial match event FIFO 801, lookup table 802, combined event/parameter FIFO 803, case conversion logic 806, cyclic redundancy check (CRC) generator 807, position counter 809, running CRC array 810, CRC processor 804, and slow-path event FIFO 805.

In one embodiment, inputs of filtering logic 800 are input data 861, partial match events 862, and end of fragment 863. In one embodiment, partial match events includes one-byte match event 172, two-byte match event 171, repeated-byte match event 173, three-byte match event 170 with respect to FIG. 1. In one embodiment, filtering logic 800 performs operations similar to selective pattern masking 151 with respect to FIG. 1.

In one embodiment, outputs of filtering logic 800 include events that are generated and stored to slow-path event FIFO 805. In one embodiment, each event in slow-path event FIFO 805 is a combination of position 850 and pattern ID 851.

In one embodiment, partial match events are generated at a faster rate than the rate that slow-path logic is able to complete a pattern match. In one embodiment, filtering logic 800 is capable of reducing slow-path workload by filtering some pattern match events. In one embodiment, filtering logic 800 generates a filtering decision on partial match events at a rate of one decision per clock cycle.

In one embodiment, from an overview perspective, filtering logic 800 performs a signature comparison upon receiving a partial match event. Filtering logic 800 looks up a signature based on a pattern identifier (derived from the partial match event 862). In one embodiment, the signature is based on two values related to the start byte and the end byte of a pattern. In one embodiment, filtering logic 800 is able to perform the signature comparison on input data of variable-length at a high rate (e.g., one decision per clock cycle) because the signature is generated based on the start byte and the end byte of the pattern rather than deriving from an entire pattern which may be more than 100 bytes in length.

In one embodiment, filtering logic 800 receives additional bytes of input data (depending on the length of a pattern) and calculates a signature based on the additional bytes of input data. In one embodiment, the additional bytes of input data are referred to herein as a remaining substring. Filtering logic 800 compares the signature to one or more expected values stored in lookup table 802. In one embodiment, filtering logic 800 determines that it is a probable match (the decision may be a false positive) if the signatures match. In one embodiment, filtering logic 800 sends the partial match event to slow-path logic for complete pattern matching. Otherwise, if the signatures do not match, filtering logic 800 discard the partial match event.

In one embodiment, filtering logic 800 generates a "net CRC" using only CRC values of the start byte and the end byte of the remaining substring. Calculation of the net CRC will be described in further detail below. In one embodiment, filtering logic 800 performs filtering without requiring re-examination of every byte of input data against the pattern. Moreover, a signature based on a net CRC value is better than a simple checksum, for example, performing XOR on every byte of the substring to generate a checksum. The simple checksum results in many false positives because the simple checksum fails to detect if the order of bytes in the input data is different from the pattern (e.g., a simple checksum remain the same if two bytes of input data are swapped).

In one embodiment, partial match event FIFO 801 receives partial match events 862. In one embodiment, each FIFO entry includes pattern identifier 841 and position 840. In one embodiment, position 840 shows the position of the partial match occurs with respect to the input data 861.

In one embodiment, case conversion 806 generates an upper case version of input data 861. In one embodiment, the upper case version of input data 861 is used in conjunction with patterns that are case-insensitive.

In one embodiment, CRC generator 807 receives input data 861. In one embodiment, CRC generator 807 computes a running CRC value for each input byte of input data 861. In one embodiment, CRC generator 807 computes a running CRC for each byte of the lower-case version of input data 861.

In one embodiment, CRC generator 807 performs CRC calculation based on CRC-11 polynomials (e.g., $x^{11}+x^2+x+1$). In one embodiment, other CRC calculation (e.g., CRC-8, CRC-11, and CRC-12) is used.

In one embodiment, running CRC array 810 receives case-sensitive CRC 811 and case-insensitive CRC 812 from CRC generator 807. In one embodiment, running CRC array 810 stores the CRC values in order (e.g., in arrays) which are possible to be read in a random order. In one embodiment, running CRC array 810 provides start CRC 821 and end CRC 823 that correspond to start address 820 and end address 822 (generated by CRC processor 804) respectively. In one embodiment, running CRC array 810 stores up CRC values corresponding to 31 bytes of input data 861. In one embodiment, the size of running CRC array 810 is configurable based on processing rates of fast-path logic and slow-path logic.

In one embodiment, position counter 809 stores a position value (relative to the start of input data) of the most recent CRC value written to running CRC array 810)

In one embodiment, lookup table 802 receives an entry from partial match event FIFO 801 (e.g., the head entry of FIFO). In one embodiment, lookup table 802 stores parameters required for the filtering operation. In one embodiment, the parameters include case sensitivity bit 831, byte count 833, and skip count 832. In one embodiment, the parameters also include at least one expected CRC value 834.

In one embodiment, filtering logic 800 compares pattern ID 841 to a range to determine whether lookup table 802 stores a valid entry with respect to pattern ID 841. In one embodiment, filtering logic 800 uses pattern ID 841 as the address to access lookup table 802 and to read parameters corresponding to pattern ID 841. If pattern ID 841 is not a valid entry of lookup table 802, lookup table 802 sets byte count 833 to zero to indicate that no filtering operation is required.

In one embodiment, lookup table 802 sends the parameters together with pattern ID 835 and position 836 to a FIFO (combined event/parameter FIFO 803). In one embodiment, pattern ID 835 and position 836 are similar to pattern ID 841 and position 840 respectively.

In one embodiment, CRC processor 804 receives an entry from combined event/parameter FIFO 803 (e.g., the head entry). In one embodiment, CRC processor 804 also receives start CRC 821 and end CRC 823 from running CRC array 810. In one embodiment, CRC processor 804 also receives end of fragment 863.

In one embodiment, if end of fragment 863 is not set, CRC processor 804 reads byte count 833. In one embodiment, if byte count 833 is zero, CRC processor sends the partial match event to slow-path logic because no filtering is required. In one embodiment, if byte count 833 is not zero, CRC processor 804 reads position 836 of the partial match, byte count 833, skip count 832, and CRC position 813. In one embodiment, CRC processor 804 reads CRC position 813 to determine whether the start CRC and end CRC of the remaining substring are available in running CRC array 810. In one embodiment, CRC processor 804 waits until CRC values are ready. In one embodiment, CRC processor reads start CRC 821 (a running checksum corresponds to the byte immediate before the remaining substring) and end CRC 823 (a running checksum corresponds to the last byte of the remaining substring). In one embodiment, CRC processor 804 calculates a net CRC based on start CRC 821 and end CRC 823. In one embodiment, CRC processor 804 compares the net CRC with one or more expected CRC(s) 834.

In one embodiment, CRC processor 804 determines whether the net CRC value matches any of expected CRC(s) 834. If there is a match, CRC processor 804 sends the partial match event (i.e., position 850 and pattern ID 851) to a FIFO (slow-path event FIFO 805) for further processing by the slow-path. Otherwise, CRC processor 804 discards the partial match event.

In one embodiment, CRC processor 804 is capable of skip a number of bytes from the beginning of the remaining substring based on skip count 832 if a pattern includes some wildcards or character classes which follows after the partial match (one-byte, two-byte, three-byte patterns).

In one embodiment, if end of fragment 833 is set (no more data will be received), CRC processor 804 does not wait until start CRC and end CRC to be ready in running CRC array 810. If start CRC 821 and end CRC 823 are ready, CRC processor 804 performs comparison of the net CRC as described above. Otherwise, CRC processor 804 discards the partial match event.

In one embodiment, K bytes of input data are stored (not shown) for later replay. In one embodiment, K is in the range of 32 bytes to 40 bytes. In one embodiment, CRC processor 804 retrieves and replays the data again before a next data fragment is ready. In one embodiment, CRC processor 804 performs filtering operation against a previous partial match event that was interrupted because of end of fragment 863 is set.

The following example shows computation of a net CRC value based on a start CRC and an end CRC. Given an property of CRC values in equation (1):

$$\text{CRC}(M1 \text{ XOR } M2) = \text{CRC}(M1) \text{ XOR } \text{CRC}(M2), \text{ where } M1 \text{ and } M2 \text{ are strings.} \quad (1)$$

Given an example of input data is "xyzabc". Given the start CRC (i.e., CRC(xyz)) and the end CRC (i.e., CRC(xyzabc)), it is possible to calculate CRC(abc) based on the two values. Assuming that initial CRC value is all zeros, CRC(abc)=CRC (000abc). By using the equation (1), net CRC is calculated as: CRC(000abc)=CRC(xyzabc) XOR CRC(xyz000), in which CRC(xyzabc) is the end CRC, whereas CRC(xyz000) is CRC (000) with an initial value of the start CRC(i.e., CRC(xyz)).

The following example shows filtering logic 800 operating in conjunction with partial match logic (e.g., pattern matching apparatus 100 with respect to FIG. 1).

In one embodiment, assuming that the length of input data is 100 bytes. Partial match logic detects a two-byte match event on the first 2 bytes of the input data. In one embodiment, filtering logic 800 reads corresponding parameters from lookup table 802 based on pattern ID 841 of the partial match.

In one embodiment, with respect to this example, assuming that the value of byte count 833 is 3 (i.e., the remaining substring is 3 bytes following the two-byte pattern). In one embodiment, filtering logic 800 reads additional 3 bytes following the two-byte partial match. In one embodiment, filtering logic 800 computes the net CRC corresponding to the remaining substring (which includes the third, fourth, and fifth bytes of the input data) using start CRC and end CRC.

In one embodiment, CRC processor 804 waits until position counter 809 stores a value that is greater than or equal to the position of the 5th byte's position (so that both the start CRC and end CRC are ready in running CRC array 810).

In one embodiment, CRC Processor 804 reads start CRC 821 (corresponding to position 2) and end CRC 823 (corresponding to position 5) from running CRC array 810. In one embodiment, CRC processor 804 computes the net CRC (corresponding to the three byte of the remaining substring) by performing an operation of start CRC 821 XOR end CRC 823. In one embodiment, CRC processor 804 compares the net CRC with one or more expected CRC(s) 834. In one embodiment, CRC processor 804 sends the partial match event to slow-path logic if there is at least one match. Otherwise, CRC processor 804 discards the partial match event.

In one embodiment, filtering logic 800 requires a smaller memory especially if compared to a bloom filter method which requires a longer signature if the size of a pattern set is larger.

Figure 9:
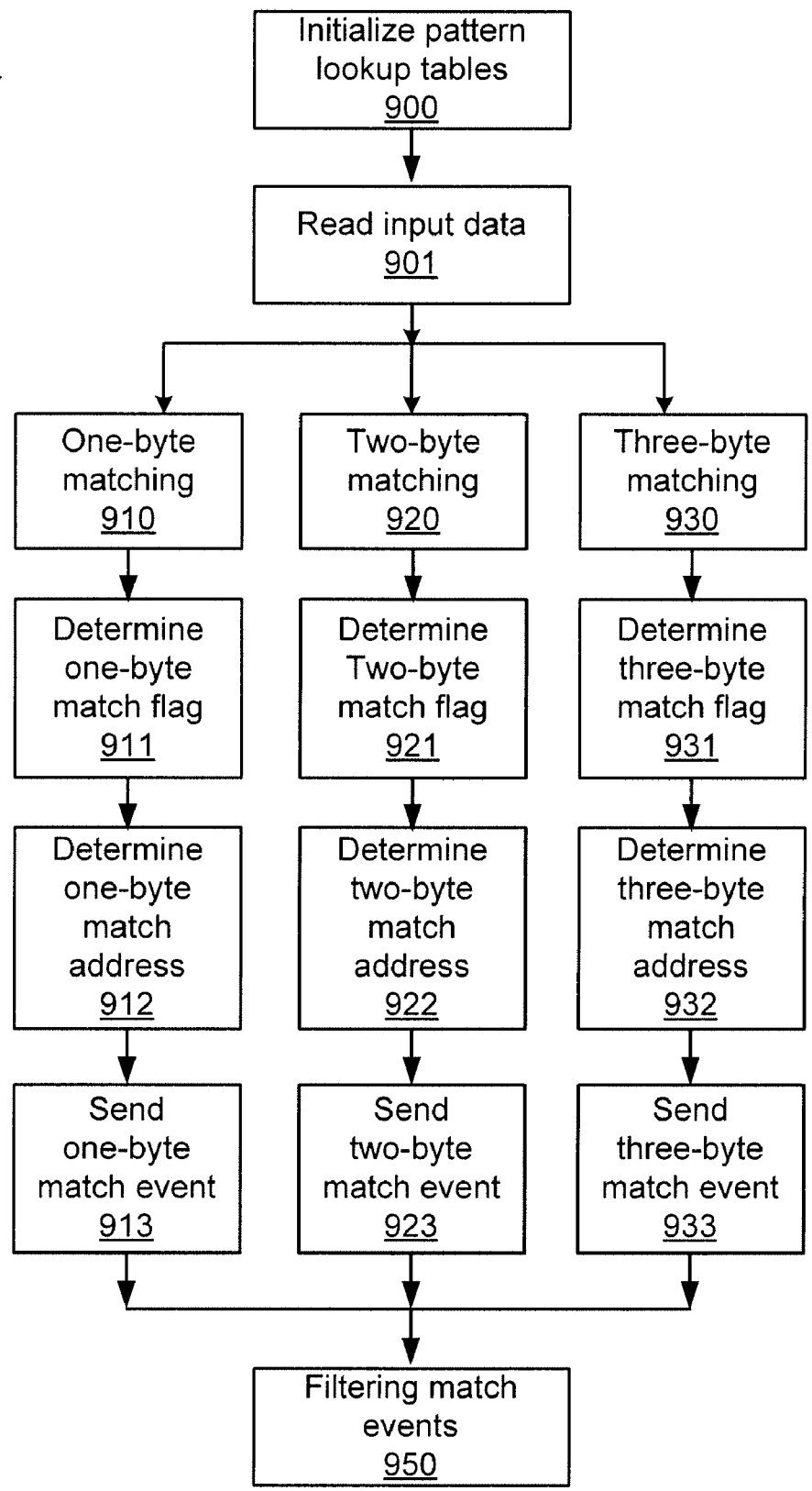
FIG. 9 is a flow diagram of one embodiment of a process to perform partial pattern matching.

FIG. 9 is a flow diagram of one embodiment of a process to perform partial pattern matching. The process is performed by processing logic that may comprise hardware (circuitry, dedicated logic, etc.), software (such as is run on a general purpose computer system or a dedicated machine), or a combination of both. In one embodiment, the process is performed in conjunction with a pattern matching device (e.g., pattern matching apparatus 100 with respect to FIG. 1). In one embodiment, the process is performed by a computer system with respect to FIG. 10.

Referring to FIG. 9, the process begins by processing logic initializes one or more pattern lookup tables (process block 900). In one embodiment, processing logic reads pattern sets from local memories. In one embodiment, pattern sets are stored in different structures. In one embodiment, processing logic receives input data and begins to perform pattern matching on the input data (process block 901).

In one embodiment, processing logic performs one-byte matching on input data (process block 910). In one embodiment, processing logic determines a one-byte match flag which is a result of pattern matching on input data with respect to the pattern lookup tables (process block 911). In one embodiment, processing logic also determines one-byte match address (process block 912) which will be used as a pattern identifier for slow-path logic. In one embodiment, processing logic generates one-byte match events, where each event includes information about one-byte match flag, one-byte match address, etc (process block 913).

In one embodiment, processing logic performs two-byte matching on input data (process block 920). In one embodiment, processing logic determines a two-byte match flag which is a result of pattern matching on input data with respect to the pattern lookup tables (process block 921). In one embodiment, processing logic also determines two-byte match address (process block 922) which will be used as a pattern identifier for slow-path logic. In one embodiment, processing logic generates two-byte match events, where each event includes information about two-byte match flag, two-byte match address, etc (process block 923).

In one embodiment, processing logic performs three-byte matching on input data (process block 930). In one embodiment, processing logic determines a three-byte match flag which is a result of pattern matching on input data with respect to the pattern lookup tables (process block 931). In one embodiment, processing logic also determines three-byte match address (process block 932) which will be used as a pattern identifier for slow-path logic. In one embodiment, processing logic generates three-byte match events, where each event includes information about three-byte match flag, three-byte match address, etc (process block 933).

In one embodiment, processing logic filters some of match events based on feedback information from slow-path logic, the pattern lookup tables, or both (process block 950). In one embodiment, processing logic performs one-byte pattern matching, two-byte pattern matching, and three-byte pattern matching concurrently.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

FIG. 10 illustrates an example of a computer system in conjunction with one embodiment of the invention. Processor 1005 accesses data from level 1 (L1) cache memory 1006, level 2 (L2) cache memory 1010, and main memory 1015. In other embodiments of the invention, cache memory 1006 may be a multi-level cache memory comprise of an L1 cache together with other memory such as an L2 cache within a computer system memory hierarchy and cache memory 1010 are the subsequent lower level cache memory such as an L3 cache or more multi-level cache. Furthermore, in other embodiments, the computer system may have cache memory 1010 as a shared cache for more than one processor core.

In one embodiment, memory/graphic controller 1016, IO controller 1017, or combinations thereof is integrated in processor 1005. In one embodiment, parts of memory/graphic controller 1016, parts of IO controller 1017, or combinations thereof is integrated in processor 1005.

Processor 1005 may have any number of processing cores. Other embodiments of the invention, however, may be implemented within other devices within the system or distributed throughout the system in hardware, software, or some combination thereof.

Main memory 1015 may be implemented in various memory sources, such as dynamic random-access memory (DRAM), hard disk drive (HDD) 1020, solid state disk 1025 based on NVRAM technology, or a memory source located remotely from the computer system via network interface 1030 or via wireless interface 1040 containing various storage devices and technologies. The cache memory may be located either within the processor or in close proximity to the processor, such as on the processor's local bus 1007. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 10. Furthermore, in other embodiments of the invention may be distributed throughout several circuits, logic units, or devices illustrated in FIG. 10.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A processor comprising:
   a memory to store a first pattern table comprising information indicative of whether a byte of input data matches a first pattern, and whether to ignore other matches of the first pattern that occur in remaining bytes of the input data;
   one-byte match logic coupled to the memory, to determine, based on the information in the first pattern table, a one-byte match event with respect to the input data; and
   a control unit to filter the other matches of the first pattern based on the information of the first pattern table.

2. The processor of claim 1, wherein the one-byte match logic is to generate an address for access to an item in a pattern database.

3. The processor of claim 1, further comprising two-byte match logic to determine, based on a second pattern table, a two-byte match event with respect to the input data; and
   to generate an address for access to an item in a pattern database based on a base address and an offset value, wherein the offset value is equal to a population count of a string associated with a two-byte pattern.

4. The processor of claim 1, further comprising three-byte match logic to detect a three-byte match event with respect to the input data, based on two or more pattern tables.

5. The processor of claim 1, further comprising three-byte match logic to detect a three-byte match event with respect to the input data, by reference to a plurality of lookup tables, wherein each entry from one of the lookup tables comprises eight 1-byte data which are used to compared with a third byte in the input data.

6. The processor of claim 1, further comprising:
   three-byte match logic to select data from a second pattern table based on a first byte and a second byte in the input data, wherein the second pattern table comprises information indicative of whether a potential 3-byte match event with respect to the input data will occur; and
   an address for access to an item in a third pattern table; and
   a comparator to compare a third byte in the input data to the item from the third pattern table.

7. The processor of claim 1, further comprising repeated-bytes match logic to determine whether two or more bytes of a same pattern exist in the input data, wherein the two or more bytes are adjacent bytes.

8. The processor of claim 1, further comprising:
   a signature generator to generate a signature based on one or more remaining bytes in the input data in a single clock cycle; and
   filtering logic to determine, based on the signature, whether to exclude the one-byte match event from further analysis.

9. The processor of claim 1, further comprising:
   a signature generator to generate a signature based on a first checksum and a second checksum associated with the input data.

10. A system comprising:
    a first memory to store a first pattern table comprising information indicative of whether a byte of input data matches a first pattern, and whether to ignore other matches of the first pattern that occur in remaining bytes of the input data;
    one-byte match logic coupled to the first memory, to determine, based on the information of the first pattern table, a one-byte match event with respect to the input data;
    a control unit to filter the other matches of the first pattern based on the information of the first pattern table;
    a data cache coupled to the first memory; and
    a second memory to store a program to perform further pattern matching on results from the one-byte match logic.

11. The system of claim 10, further comprising two-byte match logic to detect a two-byte match event with respect to the input data; and
    to generate an address for access to an item in a pattern database based on a base address and an offset value, wherein the offset value is equal to a population count of a string associated with a two-byte pattern.

12. The system of claim 10, further comprising three-byte match logic to detect a three-byte match event with respect to the input data, based on two or more pattern tables.

13. The system of claim 10, further comprising repeated-bytes match logic to determine whether two or more bytes of a same pattern exist in the input data, wherein the two or more bytes are adjacent bytes.

14. The system of claim 10, further comprising a filtering logic to exclude some of the one-byte match events from further analysis.

15. A method comprising:
    determining, by one-byte match logic, a one-byte match event with respect to input data, wherein the determining is based on a first pattern table comprising information indicative of whether a byte in the input data matches a first pattern, and whether to ignore other matches of the first pattern that occur in remaining bytes in the input data; and
    generating an address for accessing an item in a pattern database.

16. The method of claim 15, further comprising:
    determining, based on a second pattern table, a two-byte match event with respect to the input data;
    generating an address for accessing an item in a pattern database based on a base address and an offset value, wherein the offset value is equal to a population count of a string associated with a two-byte pattern.

17. The method of claim 15, further comprising:
    selecting data from a second pattern table based on a first byte and a second byte in the input data, wherein the second pattern table comprises information indicative of whether a potential 3-byte match event with respect to the input data will occur; and
    an address for accessing an item in a third pattern table; and
    comparing a third byte in the input data to the item from the third pattern table.

18. The method of claim 15, further comprising generating a signature based on one or more remaining bytes in the input data in a single clock cycle; and
    determining, based on the signature, whether to exclude the one-byte match event from further analysis.

19. The method of claim 15, further comprising generating a signature based on a first checksum and a second checksum associated with the input data.

* * * * *